United States Patent Office 2,895,652
Patented July 21, 1959

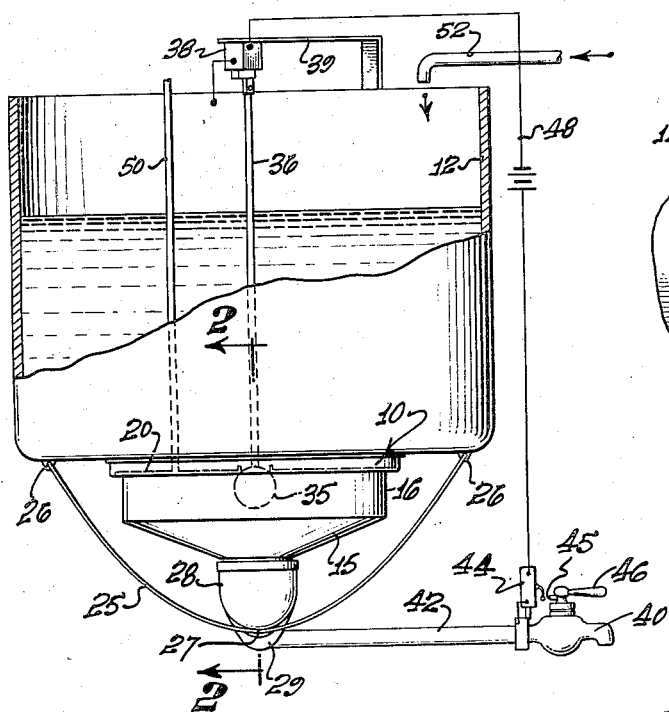
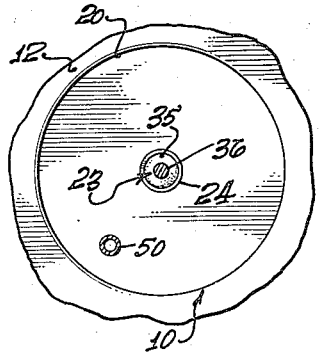
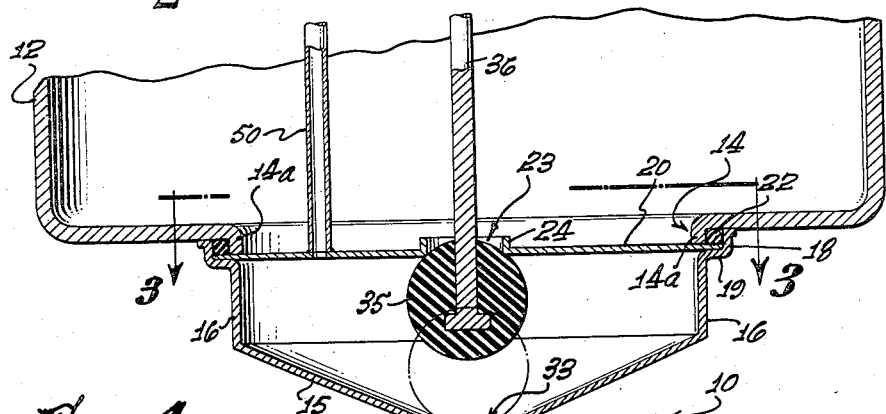
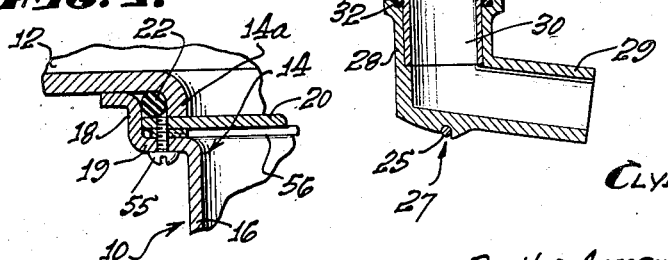
Clyde R. Rockriver,
Inventor.
By His Attorneys
Harris, Kiech, Foster & Harris.

2,895,652

MEASURING AND DISPENSING APPARATUS

Clyde R. Rockriver, Burbank, Calif., assignor to Automatic Enterprises, Inc., Los Angeles, Calif., a corporation of California Application December 17, 1956, Serial No. 628,594

9 Claims. (Cl. 222—442)

This invention relates to liquid-measuring devices, including automatic measuring means for automatic dispensing machines and the like.

A particular object of the invention is to provide a measuring device, such as for beverages and other liquids, which is accurate to within less than significant variations, or noticeable variations, to be used in automatic dispensing apparatus, and one which is easily installed.

In the automatic dispensing of beverages, hot coffee being an example, appreciable variation in quantity from serving to serving is displeasing to public patronage. Such variations in quantity may be the result of reliance upon changing hydraulic head in a tank supplying the hot coffee, or to flow controls of other types which are not uniform. When a cup receives noticeably less than a normal filling, the customer is displeased and patronage eventually drops. If amounts dispensed are, however, always up to standard, business is good.

It is therefore another object of this invention to devise a measuring device for automatic coffee-dispensing machines which is always so accurate and uniform, regardless of the height of brew in a supply vessel, that all customers are pleased with their servings.

A further object is to provide means for the stated purpose which is as simple as reciprocating valve means adapted to work quickly in a measuring vessel of fixed capacity for trapping a corresponding fixed quantity of coffee brew which is thereupon released.

Other objects of the invention, and various features of construction thereof, will become apparent to those skilled in the art upon reference to the following specification and the accompanying drawing wherein certain embodiments are illustrated.

In the drawing:

Fig. 1 is principally a side elevation illustrating the present improvement as employed in connection with a tank or other vessel supplied with hot brewed coffee;

Fig. 2 is a transverse vertical section taken on the line 2—2 of Fig. 1 illustrating the construction and operative positions of the measuring mechanism;

Fig. 3 is a horizontal fragmentary section on a reduced scale taken on the line 3—3 of Fig. 2; and Fig. 4 is a fragmentary vertical sectional detail illustrating a possible modification of the means for sealing the measuring cup in operative position.

The drawing illustrates a measuring device generally indicated at 10 disposed in operative position on the bottom wall of a coffee-supplying tank 12 having a large bottom opening 14 peripherally provided with a depending shallow flange 14a.

The measuring device 10 comprises a cup mounted below the opening 14 and including a sloping frustoconical bottom wall 15 having at its top an integral upstanding cylindrical wall 16. The top of the wall 16 carries an upstanding annular sealing lip 18 connected with the upstanding wall 16 by means of an integral radially directed annular flange 19. Resting upon the inner peripheral portion of the flange 19 is a circular top wall 20 for the cup 15, 16, the upper peripheral portion of the top 22 bearing against the lower edge of the depending flange 14a of the liquid tank 12. To provide sealed joints between the bottom of the tank 12, its flange 14a, the edge of the top wall 20, the radial flange 19 and the upstanding lip 18, there is positioned therebetween a sealing gasket which is in the form of a compressed rubber O-ring 22, that is, a compressible rubber ring circular in cross section. The top wall 20, which constitutes a cover for the measuring cup, is provided with a central opening 23 surrounded, if desired, by a shallow, upstanding rim 24.

To bind these parts in position and compress the packing O-ring 22, a looped spring bail 25 is illustrated, whose ends are secured to brackets 26 on the bottom of the tank 12. In the form illustrated, the middle of the bail 25 is snapped into a seat 27 at the bottom of a fitting 28 having a discharge neck 29 and fitting up over a downspout 30 integral with the wall 15 of the measuring cup, these parts being appropriately packed by a small external O-ring 32. A discharge opening 33 leads from the measuring cup into the neck 30, this opening 33 being vertically aligned with the opening 23 in the top wall 20.

Positioned to move between the seats provided at the edges of the intake opening 23 and the discharge opening 33 is a rubber ball valve 35 in which is imbedded the lower end of a vertical actuating rod 36. The rod 36 and its valve 35 are controlled by a solenoid 38 adjacent the top of the tank 12 and carried as by an appropriate bracket arm 39 secured to the tank 12 or adjacent framework. A faucet 40 is illustrated as means to dispense coffee by way of a line 42 connected with the discharge neck 29 of the fitting 28 supplied by the measuring cup 15, 16.

For the purpose of actuating the rod 36 through its solenoid 38, the faucet 40 may be provided with a switch 44 actuable as by a switch controlling arm 45 from an actuating handle 46 of the faucet 40. An electric line 48 connects the solenoid 38 with the switch 44, the other side of the electric circuit being completed as by grounding as indicated. When the faucet valve is opened to dispense coffee, the solenoid 38 is energized to elevate the rod 36 and bring the valve 35 up to the seat around the intake opening 23 and thereby trap a measured charge of coffee in the measuring cup 15, 16. In order to vent the measuring cup to the atmosphere so as to relieve any vacuum creating tendency as the coffee level drops in the measuring cup, a small standpipe 50 is secured to the top wall 20 and extends upward through the coffee brew to the atmosphere. Thus, trapped coffee may flow freely through the line 42 and the faucet 40 to the drinking cup or other vessel being served. Fresh coffee brew for the tank 12 may be supplied by a pipe 52 from any appropriate brewing apparatus.

When the measuring cup 15, 16 has been drained through the faucet 40, and the handle 46 is moved to off position to close the usual valve, the control arm 45 is moved to open the switch 44 so that the solenoid is deenergized. The valve 35 and its upstanding rod 36 quickly drop from the full-line position of Fig. 2 to the broken-line position, whereupon the measuring cup 15, 16 is again completely filled by flow of coffee brew through the intake opening 23, escape thereof being prevented by the seating of the valve 35 on the seat around the discharge opening 33, displaced air partially escaping upward through the inlet opening 23 and partially by way of the vent pipe 50. The capacity of the vent pipe 50 is so small that such head of coffee as accumulates therein up to the level of the brew at any time is inconsequential and does not produce any noticeable or significant difference in liquid level in a drinking cup being served.

As a possible modification of the sealed joint between the measuring device 10 and the bottom of the tank 12, the periphery of the measuring cup top 20 may be secured to the radial flange 19 by a plurality of screws 55 as seen in Fig. 4, there being a ring gasket 56 bound between these two parts. The O-ring 22 then serves to seal the joint between the top 20 and the bottom of the tank 12. With this form, which at present is not the preferred form, when the bail 25 is sprung from the illustrated position, the measuring device 10 comes away from the tank 12 intact, the valve 35, its actuating rod 36 and the vent pipe 50 being included.

From the foregoing it is apparent that the measuring means of this improvement always traps a fixed volume of coffee in the measuring cup 15, 16 between its inlet 23 and outlet 33. As soon as the faucet 40 is opened to draw off a serving of coffee, the solenoid 38 which is thereby concurrently energized, immediately snaps the valve 35 up to position to prevent brew from passing down through the intake opening 23. Since air entering through the stand-pipe 50 permits the body of liquid to pass freely to and from the faucet 40, all of the liquid, which is an exact cupful, is drained off. Closing of the faucet de-energizes the solenoid 38 and the valve 35 immediately drops to its filling position which is the broken-line position shown in Fig. 2.

Thus, regardless of the head of coffee or other liquid in the tank 12, or any other delaying or accelerating conditions, the measured volume of liquid is always exactly the same, and the quantities dispensed are always uniform.

The invention claimed is:

1. A liquid measuring and dispensing apparatus comprising: a supply tank; a measuring cup positioned below the tank; a partition between the tank and the cup provided with a circular opening establishing communication between the tank and the cup; a circular outlet opening in the cup aligned with that in the partition; a ball valve member disposed in the cup for movement from one of said circular openings to the other in seating relationship and for trapping a measured amount of liquid in the cup between the circular openings; means for withdrawing liquid from the cup; and automatic means for moving the ball valve from the circular outlet opening in the cup and into seating relationship with the opening in the partition when liquid withdrawal from the cup is initiated and for moving the valve from the opening in the partition and into seating relationship with the outlet opening in the cup when said withdrawal is terminated.

2. A liquid measuring and dispensing apparatus according to claim 1 wherein said automatic means is an electrically energized means.

3. A liquid measuring and dispensing apparatus comprising: a supply tank; a measuring cup positioned below the tank; a partition between the tank and the cup provided with a circular opening establishing communication between the tank and the cup; a circular outlet opening in the cup aligned with that in the partition; a ball valve member disposed in the cup for movement from one of said circular openings to the other in seating relationship and for trapping a measured amount of liquid in the cup between the circular openings; withdrawal valve means communicating with the outlet opening in the cup for withdrawing liquid from the cup; solenoid means connected to the ball valve member; and switching means electrically connected to the solenoid means and the withdrawal valve means for moving the ball valve from the circular outlet opening in the cup and into seating relationship with the opening in the partition when liquid withdrawal from the cup is initiated and for moving the valve from the opening in the partition and into seating relationship with the outlet opening in the cup when said withdrawal is terminated.

4. A liquid measuring and dispensing apparatus according to claim 3 wherein said withdrawal valve is a manually operated valve and the switching means is associated with the manually operated withdrawal valve for electrically energizing the solenoid when the withdrawal valve is opened and for electrically de-energizing the solenoid when the withdrawal valve is closed.

5. A liquid measuring and dispensing apparatus according to claim 1 including air vent means leading from said measuring cup to a position above the liquid level of said supply tank.

6. A liquid measuring and dispensing apparatus comprising: a supply tank adapted to contain liquid; a measuring cup positioned below the tank; a partition between the tank and cup provided with an opening establishing communication between the tank and the cup; an outlet opening in the cup; a valve member disposed in the cup for movement from one of said openings to the other in seating relationship for trapping a measured amount of liquid in the cup; means for withdrawing liquid from the cup; and automatic means for moving the valve member from the outlet opening in the cup and into seating relationship with the said opening in said partition when liquid withdrawal from the cup is initiated and for moving the valve member from the opening in the partition and into seating relationship with the outlet opening in the cup when said withdrawal is terminated.

7. A liquid measuring and dispensing apparatus according to claim 6 wherein said automatic means for moving the said valve includes a substantially vertical rod means connected to said valve, and solenoid means adapted to move said rod means and having electrical connection with said withdrawing means and actuated thereby.

8. A liquid measuring and dispensing apparatus according to claim 6 including air vent means leading from said measuring cup to a position above the liquid level of said tank.

9. A liquid measuring and dispensing apparatus according to claim 6 wherein said automatic means for moving said valve includes controlling means comprising: solenoid means; connecting means intermediate said solenoid means and said valve and responsive to actuation of said solenoid means to move said valve member reciprocally between said openings; and switch means operatively associated with said withdrawing means and connected to said solenoid means for actuation thereof.

References Cited in the file of this patent

UNITED STATES PATENTS

| | | |
|---|---|---|
| 2,093,365 | Ransom et al. | Sept. 14, 1937 |
| 2,445,501 | Vagim | July 20, 1948 |
| 2,657,835 | Gerken et al. | Nov. 3, 1953 |